United States Patent
Slutsky

[15] 3,690,671
[45] Sept. 12, 1972

[54] EDUCATIONAL COLOR ASSOCIATION GAME

[72] Inventor: Linda F. Slutsky, 5700 Bunker Hill Apt. 806, Pittsburgh, Pa. 15206

[22] Filed: March 22, 1971

[21] Appl. No.: 126,587

[52] U.S. Cl. ..................... 273/153 R, 35/28.3
[51] Int. Cl. ................. A63f 9/08, G09b 19/00
[58] Field of Search ...273/153 R, 153 P, 156, 157 R, 273/137 C, 137 D; 35/28.3, 28.5

[56] References Cited

UNITED STATES PATENTS

| | | | |
|---|---|---|---|
| 3,010,226 | 11/1961 | Kalnins | 35/28.3 X |
| 505,210 | 9/1893 | Worley | 273/156 |
| 983,730 | 2/1911 | Leach | 273/153 P UX |
| 2,162,428 | 6/1939 | Goldman | 273/157 R X |
| 3,601,404 | 8/1971 | Weisbecker | 273/137 D X |

FOREIGN PATENTS OR APPLICATIONS 1,263,118  4/1961  France ................273/157 R Primary Examiner—Anton O. Oechsle
Attorney—Carothers and Carothers

[57] ABSTRACT

An educational color association game wherein a plurality of panels, usually three or more, are each provided with a number of different color bars adjacently arranged thereon. A selection of the different color bars are common to all panels wherein the object of the game is to find the color or colors which are common to all panels and in addition to find a color that is shown only once on all panels. The difficulty in matching the colors arises due to the camouflage effect given to the common color bars by reason of their association with different colors from one panel to the next.

6 Claims, 1 Drawing Figure

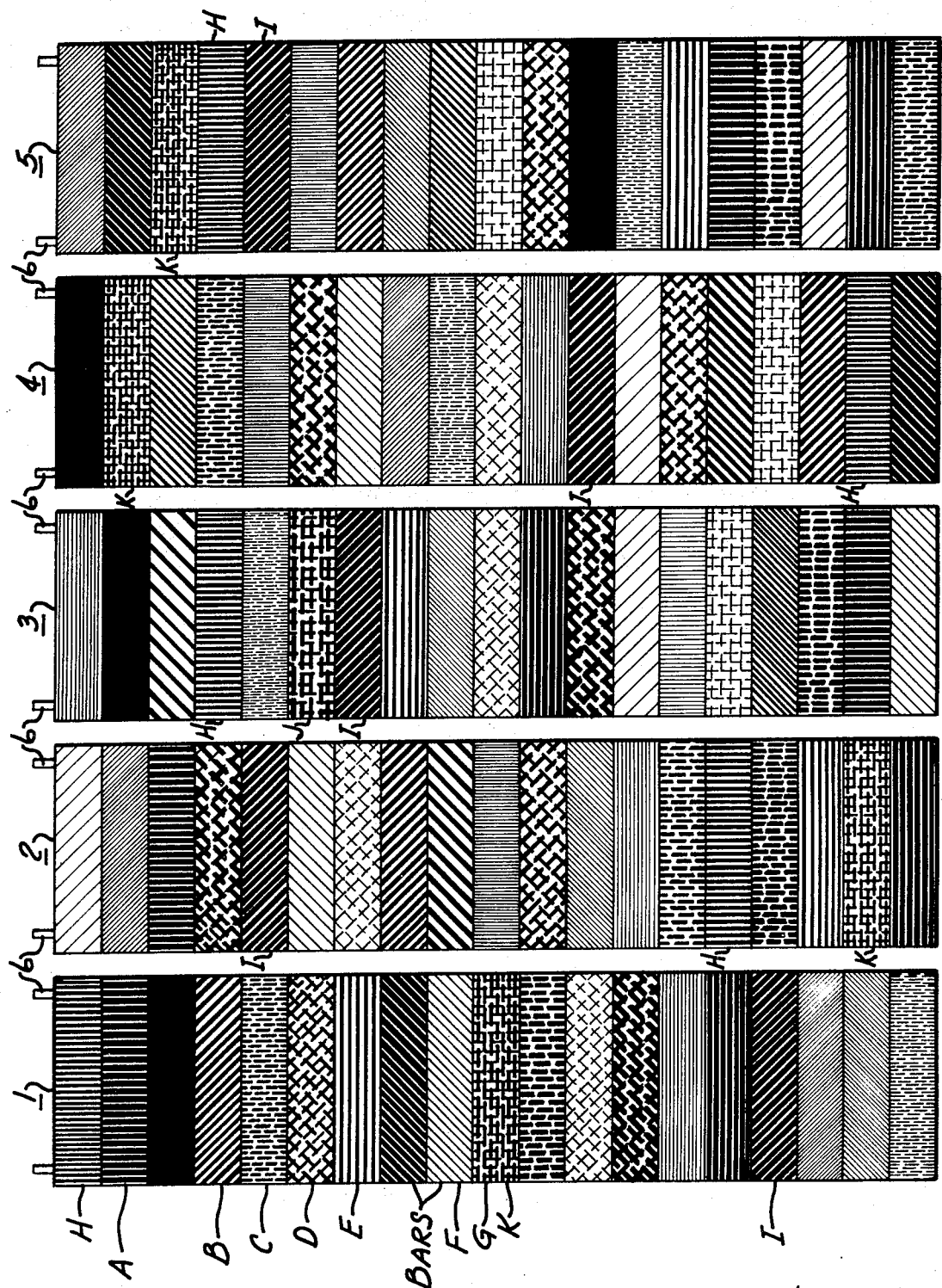

EDUCATIONAL COLOR ASSOCIATION GAME

BACKGROUND OF THE INVENTION

1. Field of Invention

This invention generally relates to educational games and more particularly to educational games for the development of the color perception and association abilities of children.

2. Description of the Prior Art

Many different games have been devised for the education of children which are involved with color pairing or comparison. Also, color comparison devices have been developed to permit one to ascertain what the effect will be upon mixing or surprinting two or more colors of a particular scale. However, little attention has been paid to sensory education devices for the development of a child's ability in not only pairing colors but in perceiving slight differences between gradations of color and in teaching them how particular associations of colors will cause each color per se to appear to change in intensity or hue.

For example, the Moisan et al., U.S. Pat. No. 1,571,488 and Stranders U.S. Pat. No. 1,428,456 effectively teach the child to compare colors but they do not provide means to illustrate to the child how color association may be used to effectively camouflage different colors. The U.S. Pat. No. 3,010,226 to Kalnins, also illustrates an educational game in which is also effective for the purposes intended and which includes the pairing of colors in addition to other sensual features, such as, size and shape of a particular playing element.

The U.S. Pat. No. 2,899,755 to Terilli discloses a system wherein a large number of color combinations are graphically recorded in an orderly manner with means to ascertain what the effect of mixing or surprinting two or more colors of the scale referred to will be.

While the prior art games and systems are effective for the purposes for which they were intended, they provide no means for effectively teaching a child not only color pairing but a keen perception for color differentiation and association with even the slightest graduations of color.

SUMMARY OF THE INVENTION

It is the principle object of the present invention to provide a color association game for children which stimulates the child's natural desire to learn color association through action, which will provide him with such action that will give him a better control of his own body and will power and which will lead him naturally from a simple action to a more difficult one, all in accordance with the educational philosophies of Dr. Maria Montessori The educational color association game of the present invention comprises a plurality of panels with each panel having a plurality of different adjacently positioned color bars displayed thereon. A selection of these different color bars on each of the panels appear on selected others of the panel and at least one of the different panel bars is common to all of the panels.

The game may be further characterized by providing one color bar in one of said panels which is different from any color bar found in all other panels.

The panels are preferably adapted such that the color bars may be rearranged in any desired manner and colors removed and added to each panel as desired such that the child may also learn color association by camouflaging the color bar common to all panels by selecting the colors which lie adjacent to the common color bar in each panel for the submission to a fellow student.

Other objects and advantages appear hereinafter in the following description and claims.

The accompanying drawing shows, for the purpose of exemplification without limiting the invention or the claims thereto, certain practical embodiments illustrating the principles of this invention wherein a plurality of panels with different color bars is illustrated.

Referring to the drawing, panels 1, 2, 3, 4, and 5 are illustrated. Each of the panels displays 19 different color bars. In this instance, the color bars are displayed on individual molded plastic blocks which may be secured together after the colors have been arranged in the desired sequence to provide the respective panels 1 through 5.

Each block displaying a color bar is provided with upwardly extending tines or projections 6 which are received in corresponding recesses (not shown) in the adjacent block of the same panel with a snug fit in order to keep the blocks engaged one with the other to form the respective panel.

The student thus rearranges the color bars such that at least one color bar is common to all of the panels 1 through 5. The student or teacher further associates the common color bar in each panel with different colors from one panel to the next in order to camouflage the common color bar of each panel such that the common color bar in each panel will take on a different characteristic from the same common color bar of another panel. In this manner, finding the color bars common to all panels and aligning the same in a straight line becomes much more difficult and forces the child to distinguish color hues and tints and to understand the effects of color association.

To make the game even more interesting, the student or teacher may also provide one color bar in one panel which appears on no other panel.

Unfortunately, the use of the color coding system as illustrated in the drawing, does not serve to permit one to fully appreciate the educational game of the present invention. However, it has been attempted to illustrate the game to the fullest extent possible by providing different degrees of thicknesses and spacings of shade lines to illustrate the colors and the different hues and tints within each color. Each different basic shade line pattern employed is used to illustrate a different basic color. The thickness of and spacing between lines of each basic line pattern is used to indicate the particular color hue and tint for the basic color illustrated. Very heavy shade lines which are closely spaced will indicate a very dark shade of the color indicated by the pattern. Very fine lines indicate a very light shade of a particular color and lines that are very fine and widely spaced would indicate a very pale shade of the color. In other words, the hue would be extremely light. The color tints may also (and preferably do) vary but this is difficult to illustrate by graphics.

The straight line vertical pattern, such as illustrated on color bar A, for example, indicates colors in the red family. Straight lines inclined upwardly to the left of the figure indicate the green family such as illustrated at B. Vertical dashed lines as shown at C indicate a violet or purple color. Straight dashed lines inclined both to the left and to the right as shown at D are used to indicate orange colors. The horizontal lines such as shown at E indicate colors which are basically blue. Diagonal lines extending upwardly to the right are used to indicate brown colors such as illustrated at F. Vertical and horizontal dashed lines combined indicate yellows such as shown at G.

The educational color association game of the present invention can be best understood by actually participating in the game. There is at least one color common to all five panels. The child is urged to find the common colors and to form a straight line with the color bars by matching the common color bars side by side. The child must not only match the camouflaged common color bars of each panel but he must also determine whether there is more than one color common to all panels. This is very difficult for the child as a color bar on one panel will appear to be different from the identical color on another panel due to the camouflaging effect given to the respective color bars by their association to other colors selected to be adjacent the common color bar.

To make the game or process even more difficult and to force the child to learn color association much faster, a large number of the color bars are made common to all panels except one or two. In other words, color bars other than those selected to be the color bars to all panels are provided on more than one panel in order to throw the player off track and to note color associations other than those merely associated with the common color bars. For example, it may be noted that a black color bar appears on panels 1, 3, 4, and 5. However, no black color bar appears on panel 2. The child must, in any event, follow these black color bars through anyhow in order to actually determine that this bar does not appear on all panels and in so doing the child acquires a keener sense for color association. The child also increases his ability to camouflage colors by rebuilding the panels himself and having a fellow student solve the puzzle. The game is, of course, provided with many extra color bars so that when the student or teacher rearranges the panels, he may readily change the color bars which are common to all panels.

In the FIGURE, it will be observed upon close scrutiny that there are two color bars common to all five panels. These are the bright red color bars H and the dark green color bars I.

There is also one color bar in the FIGURE which appears in only one panel. This is the bright yellow color bar J in panel 3. The child is confused to believe at first that the bright yellow color bar J in panel 3 is the same as color bars K found in panels 1, 2, 4, and 5 because of the fact that when each of these color bar panels is viewed individually, the particular colors associated with these color bars K and J, make the bars to appear a somewhat different hue and tint than they actually are when viewed alone.

To illustrate how a color is camouflaged by the colors which are associated with the color in question, this can be seen by observing color bar H in panel 1 and color bar H in panel 3 separately. Note that when color bar H in panel 1 is viewed by itself, then color bar H in panel 3 is viewed by itself, one is given the impression that the color bar H in panel 3 is of a slightly lighter shade or hue than that in panel 1 when, in fact, this is not true. The color tint will also appear to change but this cannot be illustrated in the figure. This can be noted with each different color. The child thus acquires a very fine or critical ability to distinguish even the slightest difference in color hues and tints when associated with other colors and to learn what the effects will be when colors of different types are associated with a particular color.

I claim:

1. An educational color association game comprising a plurality of panels each constituted by a plurality of abutting color bars substantially of the same height and serially displayed vertically in random fashion such that each color bar is of a different color than any other on the same panel, a selection of said different color bars on each of said panels appearing on selected others but not all of said panels, at least one of said different color bars being common to all of said panels.

2. The education color association game of claim 1 wherein more than one of said different color bars are common to all panels.

3. The educational color association game of claim 1 wherein one color bar in one of said panels is different from any color bar of all other of said panels.

4. The educational color association game of claim 1 characterized by means to select and rearrange said color bars on each of said panels.

5. The educational color association game of claim 4 wherein said means consists of blocks having each of said different color bars displayed on a different one of said blocks, said blocks having means to attach them one to another to form said panels.

6. The educational color association game of claim 5 wherein said means to attach said blocks together consists of protrusions extending from each of said blocks and corresponding recesses in each of said blocks to receive the protrusions of adjacent ones of said blocks in snug engagement.

* * * * *